Patented Sept. 16, 1924.

1,509,085

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS FOR WHIPPING RECONSTRUCTED CREAM.

No Drawing. Application filed January 19, 1923. Serial No. 613,766.

*To all whom it may concern:*

Be it known that I, CHARLES E. NORTH, a citizen of the United States of America, and resident of Montclair, in the county of Essex and State of New Jersey, have invented certain new and useful Improvements in Processes for Whipping Reconstructed Cream, of which the following is a full, clear, and exact description.

The production of what is commonly known as reconstructed milk and cream has within a very recent period been developed to a point where it is now possible to obtain the two chief constituents of ordinary milk in a pure, permanent and wholesome form and to combine them with water to make a product having all the characteristics of the original milk including flavor and odor. The whole milk in its original form is treated by certain known processes for separating out the fat, and the skim milk is subjected to further treatment whereby the water is recovered by evaporation leaving the solid constituents in a flaky or powdered form. Both ingredients are permanent, if properly protected, both retain their original chemical composition, and by suitable processes of emulsifying or homogenizing with pure water are recombined as milk or as cream according to the relative proportions which are used.

Before this result was obtainable reconstructed milk was known, but it was produced only from impure, partially decomposed and perishable products, the fat element having been usually produced from butter in a more or less impaired condition.

In the case of all grades of reconstructed milk and cream, however, it is a matter of common knowledge to those interested in the art, that a good whipped cream cannot be produced by any of the usual and known methods of whipping fresh or natural cream. While perfectly good reconstructed cream is available and a highly useful commodity it cannot be whipped or beaten to a froth that remains in such condition for any length of time, and this is one if not the main obstacle to its use by hotels, confectioners or cooks.

The invention upon which my present application is based is a process for producing a permanent froth or the product known as whipped cream, from reconstructed milk, and this new process is carried out in the following manner. I first for example produce a high class reconstructed milk by homogenizing 4 per cent of pure milk oil, 8½ per cent or even more of dry skim milk or milk powder, and 88 per cent of pure water. After these ingredients are mixed together they are passed through any good form of emulsifying machine, but it must be carefully observed that this the first step must not result in what might be called a reconstructed cream but a reconstructed milk.

The next step in the process consists in passing this reconstructed milk through an ordinary cream separator whereby the cream proper is separated from the skim milk. The separator should be adjusted so as to produce a cream containing not less than 30 per cent of milk fat for the best results.

If this cream be allowed to cool to a relatively low temperature, for example of about 40° F., it may be readily whipped by an eggbeater or any other device suitable for such purpose. It will thereafter retain its character and form as whipped cream, and "stand up" for several days if kept in an ordinary refrigerator.

My theory, based upon my present information, for this reseult may be stated thus: In the common practice of making reconstructed milk and cream the maker weighs or measures out the necessary proportions of milk fat, skim milk powder and water for the particular grade of product which is desired. For example, to produce 100 pounds of milk he would weigh out 4 pounds of milk fat, 8½ pounds of skim milk powder, and 88 pounds of water. For a cream he would use 30 pounds of milk fat, 8½ pounds of skim milk powder, and 61½ pounds of water, and in each case the ingredients are mixed and then passed through an emulsifying machine. The stability of the emulsion depends not only on the size of the fat globules produced by the emulsifying machine, but upon the viscosity of the milk serum due to the solids not fat held by the water in solution or suspension.

It is extremely difficult to obtain a dry skim milk flake or powder that is completely soluble or colloidal in water, as under almost all circumstances a certain percentage of the dry products remain in suspension in the form of fine solid particles and larger undissolved particles which form a sediment at the bottom of the container holding the mixture. If, however, such a reconstructed milk be passed through a centrifugal cream separator, in which the force of gravity is multiplied thousands of times, the undissolved particles fly out to the circumference of the bowl and are thrown out with the water while only the completely dissolved parts of the powder pass out at the center of the machine and emerge as cream.

There is thus, I believe, a marked difference between the character and composition of ordinary reconstructed cream and that produced by the separation of a reconstructed milk, as the latter contains much more of the skim milk solids in colloidal and dissolved form and much less in undissolved and suspended form than does the former. For this reason the separated cream from reconstructed milk contains a much better binder for its emulsion and its serum has a much higher viscosity. It is this higher viscosity that enables the cream to be whipped and to retain its form after whipping.

My improvement, therefore, involves the production of a reconstructed cream free from undissolved or suspended milk solids, and in which the serum has a sufficient viscosity to enable the cream when whipped to retain its form or frothy condition.

What I claim is—

1. The process of producing a whipped reconstructed cream which consists in producing the cream in a form in which it is free from all undissolved or suspended milk solids not fat, and agitating the same to bring it into a condition of froth.

2. The process of producing whipped reconstructed cream which consists in producing reconstructed milk, separating out the cream in a form in which it is free from all undissolved or suspended milk solids not fat and whipping the same.

In testimony whereof I hereto affix my signature.

CHARLES E. NORTH.